(12) United States Patent
Bourzier

(10) Patent No.: US 8,145,461 B2
(45) Date of Patent: Mar. 27, 2012

(54) METHOD OF FUNCTIONAL CONTROL OF AN INERTIAL PLATFORM OF A MOVING CRAFT

(75) Inventor: Laurent Bourzier, Bourges (FR)

(73) Assignee: MBDA France, Paris (FR)

( * ) Notice: Subject to any disclaimer, the term of this patent is extended or adjusted under 35 U.S.C. 154(b) by 386 days.

(21) Appl. No.: 12/444,341

(22) PCT Filed: Oct. 4, 2007

(86) PCT No.: PCT/FR2007/052076
§ 371 (c)(1),
(2), (4) Date: May 13, 2009

(87) PCT Pub. No.: WO2008/040917
PCT Pub. Date: Apr. 10, 2008

(65) Prior Publication Data
US 2010/0036635 A1 Feb. 11, 2010

(30) Foreign Application Priority Data
Oct. 5, 2006 (FR) ...................................... 06 54113

(51) Int. Cl.
*G06G 7/48* (2006.01)
*G01C 21/00* (2006.01)
(52) U.S. Cl. ................. 703/8; 703/7; 701/220
(58) Field of Classification Search .................. 703/8, 5, 703/7; 701/220; 702/111
See application file for complete search history.

(56) References Cited

U.S. PATENT DOCUMENTS

| 4,734,702 | A | * | 3/1988 | Kaplan ........................... 342/424 |
| 5,610,815 | A | * | 3/1997 | Gudat et al. ...................... 701/23 |
| 2007/0032951 | A1 | * | 2/2007 | Tanenhaus et al. ........... 701/220 |
| 2008/0054072 | A1 | * | 3/2008 | Katragadda et al. .......... 235/384 |

OTHER PUBLICATIONS

Yue, Xie et al., "Modeling and Robust Adaptive Control of a 3-Axis Motion Simulator", 2001 IEEE.*
Burman, Helen, "Calibration and Orientation of Airborne Image and Laser Scanner Data Using GPS and INS", Apr. 2000, Department of Geodesy and Photogrammetry, Royal Institute of Technology, pp. (7, 8, 21, 22, 89, 90).*
Hall, John J. et al., "Cartesian Control for the Inertial Measurement Unit Calibration Platform", Sep. 10-13, 2000. 2000 ASME Design Technical Conferences, 26th Biennial Mechanisms Conference, Parallel Manipulator Design, Path Planning, and Control.*
International Search Report dated. Apr. 22, 2008 for PCT/FR2007/052076.

(Continued)

Primary Examiner — Dwin M Craig
Assistant Examiner — Cedric D Johnson
(74) Attorney, Agent, or Firm — Pillsbury Winthrop Shaw Pittman, LLP

(57) ABSTRACT

A method for verifying an inertial unit for a moving body, the unit being mounted on a movement simulator, and the method includes: theoretical modeling of the inertial unit on the movement simulator, supplying theoretical inertial data representing measurement inertial data deemed to be measured by the inertial unit; simulation modeling including modeling of the inertial unit in a real navigation environment, the simulation modeling being fed with control commands and supplying simulation inertial data representing output data from the inertial unit in real navigation environment; calculating control commands as a function of the measurement inertial data, the simulation inertial data, and the theoretical inertial data; and validating the inertial unit by comparing the path of the moving body with a reference path.

13 Claims, 3 Drawing Sheets

OTHER PUBLICATIONS

Wilson et al; "Unsteady RANS Method for Ship Motions with application to roll for a surface combatant"; vol. 35, No. 5, Jun. 2006, pp. 501-524; Computers and Fluids, Pergamon Press, NY, NY, XP005214840; ISSN; 0045-7930.

Li, D et al.; "Modeling, Simulation, and Control of a Hydraulic Stewart Platform"; vol. 4., Apr. 20, 1997, pp. 3360-3366; Proceedings, 1997 IEEE International Conference on Albuquerque, NM, USA, XP010235479; ISBN: 0-7803-3612-7.

Vanzwieten, J. et al., "Design of a Prototype Ocean Current Turbine-Part I Mathematical Modeling and Dynamics Simulation"; vol. 33, No. 11-12, Aug. 2006, pp. 1485-1521; Ocean Engineering, Elmsford, NY, US, XP005544815; ISSN: 0029-8018.

* cited by examiner

METHOD OF FUNCTIONAL CONTROL OF AN INERTIAL PLATFORM OF A MOVING CRAFT

CROSS-REFERENCE TO RELATED APPLICATIONS

This is the U.S. National Stage of PCT/FR2007/052076, filed Oct. 4, 2007, which in turn claims priority to French Patent Application No. 0654113, filed Oct. 5, 2006, the entire contents of both applications are incorporated herein by reference in their entireties.

FIELD OF THE INVENTION

The field of the present invention is that of verifying the functioning of an inertial unit for a moving body, the unit being mounted on a movement simulator.

PRIOR ART

Generally speaking, a vehicle such as an aircraft, a rocket, or any other type of moving body is equipped with a navigation and control system comprising an onboard computer, an inertial unit, and control means to provide three-dimensional location, control, and guidance of the moving body.

More particularly, the control means (for example aerodynamic control surfaces) direct the moving body toward a designated destination or along a particular path by means of commands received from the onboard computer, which receives inertial information from the inertial unit. From this inertial information, the onboard computer estimates the three-dimensional location of the moving body and, as a function thereof, sends instructions or commands to the control means so that the moving body follows its route to its destination.

However, if the inertial unit is suffering from a fault, the computer produces its estimates of the three-dimensional location of the moving body from inaccurate inertial information. The onboard computer therefore makes errors at each calculation step and sends erroneous commands to the control means. Consequently, the true path of the moving body is very different from the path estimated by the onboard computer. Accordingly, if the inertial unit is suffering from a serious fault, the instructions sent by the onboard computer are so inappropriate that there is the risk of the moving body becoming destabilized.

Thus movement simulators are often used to verify inertial units. More particularly, hybrid simulation is used employing real subsystems (for example an inertial unit, a movement simulator, an onboard computer of the moving body, certain other elements of the moving body, etc.) together with mathematical models of other subsystems (for example, further elements of the moving body, the atmosphere, etc.).

At present, in hybrid simulation using inertial units, two situations can arise with regard to information coming from the accelerometers of the inertial unit.

In the first situation, the information from the accelerometers is not used and is replaced by information from a mathematical model. This is associated with the fact that the movement simulator cannot reproduce movements in translation. Accordingly, the information from the accelerometers of the inertial unit is incomplete and includes no information concerning the linear displacement of the moving body. Consequently, the onboard computer of the moving body cannot use information from the accelerometers of the inertial unit to determine the location of, to control, and to guide the moving body. The anomalies potentially present in this information are consequently not detected by the hybrid simulation. In other words, the contribution of the accelerometers of the real inertial unit is absent, which rules out detecting even the slightest potential fault affecting the accelerometers.

In the second situation, the information from the accelerometers is complemented by information representing movement in translation calculated by means of a mathematical model. However, the information from the accelerometers of the inertial unit is measured at a fixed point corresponding to the coordinates of the simulation laboratory and is therefore not entirely representative of the information that the accelerometers would provide, for the same physical origin, as the moving body travels along its path around the Earth. For example, the gravitational field at the laboratory fixed point is invariant, whereas that sensed by the accelerometers of the inertial unit onboard the moving body traveling around the Earth varies as a function of altitude and latitude. This difference therefore falsifies the path of the moving body obtained using the inertial unit at the laboratory fixed point and makes the results difficult to interpret. Because of this, that method can detect only a crude fault affecting one or more accelerometers of the inertial unit.

Moreover, information from the gyros of the inertial unit is not entirely representative of what this information would be during real movement of the moving body around the Earth.

The way the Earth's rotation is resolved about the axes of the gyros differs depending on whether the inertial unit is located at a point with fixed coordinates (as in hybrid simulation in the laboratory) or is onboard a moving body moving around the Earth. The impact of this incomplete representation complicates the analysis of the hybrid simulation results obtained.

Moreover, the movement simulator must have angular dynamic performance better than or equal to requirements along the whole of the path of the moving body, which can require a very sophisticated and very costly movement simulator.

OBJECT AND SUMMARY OF THE INVENTION

The present invention consists in a method of verifying the functioning of an inertial unit for a moving body, the unit being mounted on a movement simulator and supplying in real time measurement inertial data representing a movement applied by said movement simulator, said method comprising:
  theoretical modeling of the inertial unit on the movement simulator, said theoretical modeling being fed in real time with kinematic data actually executed by the movement simulator and supplying in real time theoretical inertial data representing said measurement inertial data deemed to be measured by the inertial unit on the movement simulator;
  simulation modeling comprising modeling of the inertial unit in a real navigation environment, the simulation modeling being fed in real time with control commands and supplying in real time simulation inertial data representing output data from the inertial unit in said real navigation environment, said simulation modeling taking account of said control commands to compute a path of the moving body using the inertial unit;
  calculating said control commands as a function of the measurement inertial data, the simulation inertial data, and the theoretical inertial data; and validating the inertial unit by comparing the path of the moving body obtained using the inertial unit with a predetermined reference path.

The method of the invention produces a path of the moving body that is very close to reality and is not affected by the problem associated with the measurements effected at a fixed point, thus enabling verification of whether the inertial unit has characteristics conforming to requirements, thereby implying an enhancement in terms of quality and cost.

The measurement inertial data advantageously includes accelerometer information from accelerometers of said inertial unit, and the theoretical inertial data advantageously includes theoretical accelerometer information.

Thus any faults emanating from the accelerometers of the inertial unit can be detected.

The measurement inertial data advantageously further includes gyro information from gyros of said inertial unit, the theoretical inertial data advantageously includes theoretical gyro information, and the simulation inertial data includes simulation gyro information and simulation accelerometer information.

Thus the accelerometer and gyro information used to calculate control commands is representative of the information that would be provided by the inertial unit onboard the moving body when traveling along its path around the Earth. This is because this accelerometer and gyro information comprises accelerometer and gyro information from the inertial unit and complementary information calculated in real time by theoretical modeling and simulation.

In one particular implementation of the present invention, said control commands are calculated as a function of inertial data I defined as the sum of the measurement inertial data R plus the simulation inertial data T2 minus the theoretical inertial data T1 (in other words, I=T2−T1+R).

Thus an underspecified movement simulator can be used for highly dynamic transients of the path. By virtue of the principle I=T2−T1+R, since R and T1 depend on the movements accomplished by the movement simulator, they remain consistent, even if the simulator does not execute the command correctly. This computes an accurate path of the moving body at lower cost.

The inertial unit can be considered valid when the difference between the inertial data I and the simulation inertial data T2 is bounded by a predetermined threshold value (in other words when |I−T2|≦ε).

Thus the inertial unit can be validated efficiently and with very high accuracy.

The method of the invention further includes phase advance modeling fed in real time with input kinematic commands from simulation modeling and supplying output kinematic commands to the movement simulator to compensate an execution delay inherent to said movement simulator.

Thus execution delays can be compensated, enabling all parameters to remain in phase so as to guarantee that use of the inertial unit and any other sensors simultaneously on the movement simulator is representative.

Said input kinematic commands advantageously have a profile synchronous with that of the kinematic data and the amplitudes of said kinematic data and said input kinematic commands are advantageously consistent.

Thus the kinematic data conforms to the movements actually executed by the movement simulator, enabling the real inertial unit to be simulated in phase with the kinematics of the moving body. This guarantees that use of the inertial unit is representative and assures synchronism relative to the kinematics of the moving body for any other sensors on the movement simulator at the same time as the inertial unit.

The method of the invention advantageously further includes masking modeling downstream from the simulation modeling and upstream from the phase advance modeling, so that the masking modeling is fed in real time with the input kinematic commands, this masking modeling supplying masked kinematic commands to the phase advance modeling to mask at least some of the phases of the movement.

Thus a path can be produced for which the angular range of movement of the moving body is greater than that authorized by the movement simulator.

According to one feature, at least some of the masked kinematic commands depend on a law internal to the masking modeling that is independent of the input kinematic commands.

This enables a path on which the moving body can execute a number of loops or circuits to be computed using a movement simulator having a limited range of angular movement.

The invention is also directed to a system for verifying the functioning of an inertial unit for a moving body, the unit being mounted on a movement simulator and supplying in real time measurement inertial data representing a movement applied by said movement simulator, said system comprising:

a theoretical model comprising modeling of the inertial unit on the movement simulator, the theoretical model being fed in real time with kinematic data actually executed by the movement simulator and supplying in real time theoretical inertial data representing said measurement inertial data deemed to be measured by the inertial unit on the movement simulator;

a simulation model comprising modeling of the inertial unit in a real navigation environment, the simulation model being fed in real time with control commands and supplying in real time simulation inertial data representing output data from the inertial unit in said real navigation environment, said simulation model taking account of said control commands to compute a path of the moving body using the inertial unit;

calculation means for calculating said control commands as a function of the measurement inertial data, the simulation inertial data, and the theoretical inertial data; and validation means for validating the inertial unit by comparing the path of the moving body obtained using the inertial unit with a predetermined reference path.

The calculation means are adapted to determine said control commands as a function of the inertial data I defined by the sum of the measurement inertial data R plus the simulation inertial data T2 minus the theoretical inertial data T1.

The validation means are adapted to consider the inertial unit valid when the difference between the inertial data and the simulation inertial data is bounded by a predetermined threshold value.

The system further comprises a phase advance model fed in real time with input kinematic commands from the simulation model and supplying output kinematic commands to the movement simulator for compensating an execution delay inherent to said movement simulator The system further comprises a masking model between said simulation model and upstream said phase advance model, so that the masking model is fed in real time with the input kinematic commands, the masking model supplying masked kinematic commands to the phase advance model to mask at least some of the phases of the movement.

The invention is also directed to a computer program comprising code instructions for executing steps of a control method having at least one of the above features when it is executed on a computer.

BRIEF DESCRIPTION OF THE DRAWINGS

Other features and advantages of the device and method of the invention emerge more clearly from a reading of the description given below by way of non-limiting illustration and with reference to the appended drawings, in which.

DETAILED DESCRIPTION OF EMBODIMENTS

Figure 1:
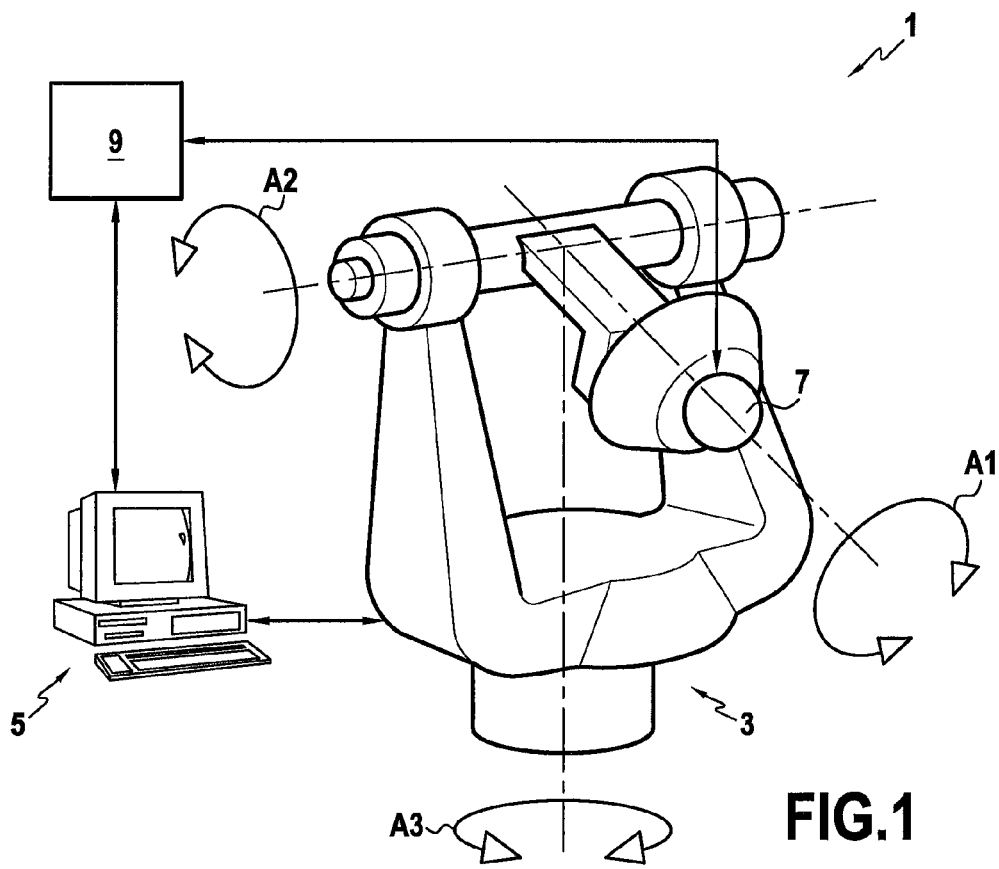
FIG. 1 shows diagrammatically a function verification system of the invention for verifying the functioning of an inertial unit for a moving body.

FIG. 1 shows diagrammatically a function verification system 1 for verifying the functioning of an inertial unit for a moving body. This system 1 comprises a movement simulator 3 connected to an electronic data processing device or computer 5 used to execute the instruction codes of an electronic data processing program adapted to execute the method of the invention.

The movement simulator 3 can produce angular displacements about a roll axis A1, a pitch axis A2, and a yaw axis A3. Accordingly, by accommodating an inertial unit 7, the movement simulator 3 can apply thereto angular movements about the roll axis A1, the pitch axis A2, and the yaw axis A3. Note that the inertial unit 7 can be mounted on the movement simulator 3 on its own, in the moving body (this is not shown), or in at least part of the moving body.

The function verification system 1 further comprises an onboard computer 9 of the moving body that is connected to the inertial unit 7 and to the computer 5.

Note that the various connections between the computer 5, the movement simulator 3, the onboard computer 9, and the inertial unit 7 can be provided by electrical or optical cables, by radio, or by other means.

Figure 2:
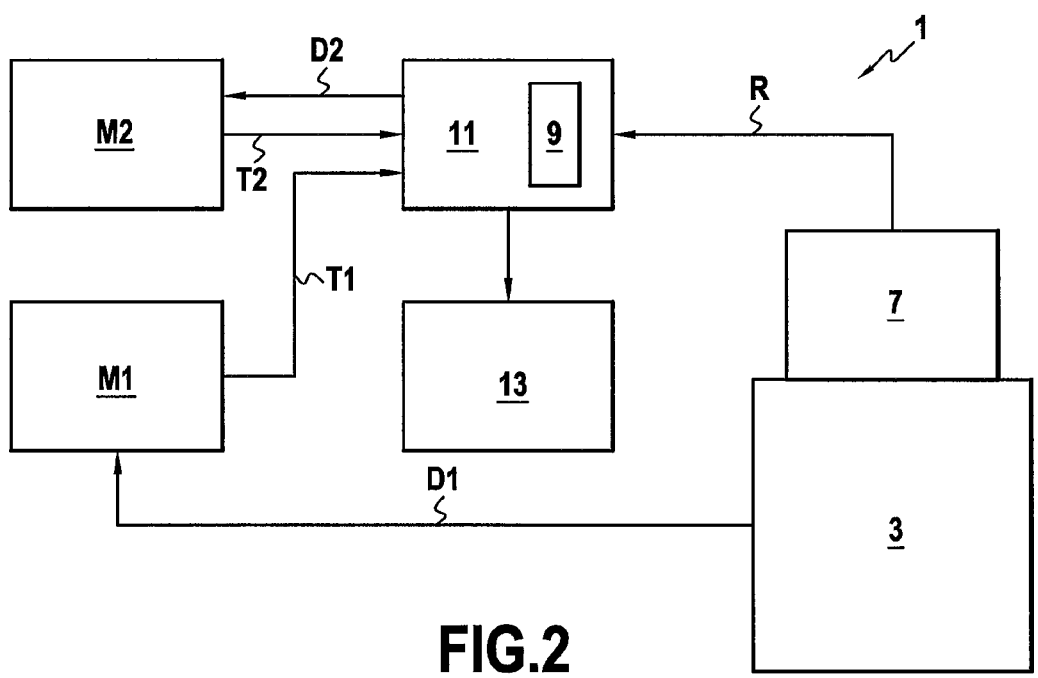
FIG. 2 shows highly diagrammatically one example of the function verification system from FIG. 1.

FIG. 2 illustrates highly diagrammatically one example of a function verification system 1 of the invention for verifying the functioning of an inertial unit 7 for a moving body (not shown). Note that FIG. 2 also illustrates the main steps of the control method of the invention.

This method or system is used in a real closed-loop hybrid simulation using real subsystems (the inertial unit 7, the movement simulator 3, the onboard computer 9 of the moving body, and possibly at least part of the moving body) and numerical models of other subsystems (for example the propulsion subsystem of the moving body) and the environment (the atmosphere). The output of the real subsystems is input for the numerical models and the output of the numerical models is input for the real subsystems.

The inertial unit 7 is mounted on the movement simulator 3 (on its own or in at least part of the moving body) and it supplies in real time inertial measurement data (i.e. real inertial data) R representing movement that is applied by the movement simulator 3 and reproduces the angular movements of the moving body in terms of range of movement, speed, and acceleration. This measurement inertial data R comes from gyros (rate gyros or free gyros) and accelerometers (not shown) of the inertial unit 7 and generally enables the onboard computer 9 of the moving body to determine its location, to control it, and to guide it.

This control system 1 further comprises a theoretical model M1, a simulation model M2, calculation means 11, and validation means 13. The theoretical model M1 and the simulation model M2 can be included in the electronic data processing device 5 from FIG. 1. Moreover, the calculation means 11 include the onboard computer 9 of the moving body.

The hybrid simulation proceeds in real time. Thus calculations and exchanges of data between the onboard computer 9 of the moving body and the theoretical model M1, the simulation model M2, and the inertial unit 7 are effected at the real frequency timing the operations performed by the onboard computer 9 of the moving body and advantageously within a time period that is less than the period corresponding to that frequency; this applies to each computation loop.

The theoretical model M1 models the onboard inertial unit 7 on the movement simulator 3 and is fed in real time by the movement simulator 3 with kinematic data D1 (positions, speeds, and angular accelerations actually executed by this movement simulator 3). Consequently, the theoretical model M1 supplies the calculation means 11 in real time with theoretical inertial data T1 representing measurement inertial data R deemed to be measured by the inertial unit 7 onboard the movement simulator 3.

The simulation model M2 models the inertial unit 7 in a real navigation environment and is fed in real time with control data or commands D2 by the calculation means 11. In return, the simulation model M2 supplies in real time simulation inertial data T2 representing the output data of the inertial unit 7 in a real navigation environment.

Thus the simulation model M2 takes account of the control commands D2 in order to compute a path of the moving body using the inertial unit 7.

The calculation means 11 calculate the control commands D2 as a function of the measurement inertial data R, the simulation inertial data T2, and the theoretical inertial data T1.

The validation means 13 can then validate the inertial unit 7 by comparing the path of the moving body obtained using the real inertial unit 7 with a predetermined reference path.

The predetermined reference path can be computed by entirely numerical simulation, for example by the simulation model M2 alone, including modeling of all the real equipment including the onboard computer and the inertial unit. This is known in the art.

The predetermined reference path is obtained in a manner that is known in the art by an entirely numerical simulation model in which all the real equipment including the computer and the inertial unit are rendered numerically.

Thus the validation means 13 compare off-line the predetermined reference path produced entirely numerically with the path of the moving body produced by the function verification system 1 using in real time the real inertial unit 7 and the real onboard computer 9. Comparative examination of the results determines either that the inertial unit 7 is valid, i.e. that it has characteristics conforming to requirements, or that the inertial unit is not valid. In particular, if the two paths are superposed the inertial unit 7 can be considered to be perfect.

The measurement inertial data advantageously includes accelerometer information from the accelerometers of the inertial unit in addition to gyro information from the gyros of the inertial unit 7. Similarly, the theoretical inertial data T1 includes theoretical accelerometer information and theoretical gyro information.

The information from the accelerometers of the real inertial unit 7 contributes to location, control, and guidance of the moving body by the onboard computer 9. Thus the anomalies potentially present in this information can be detected by comparing the accelerometer information from the real inertial unit 7 and that from the theoretical model M1.

Furthermore, the simulation inertial data T2 includes simulation gyro information and simulation accelerometer information.

Thus the accelerometer and gyro information used to calculate the control commands is representative of that which would be supplied by the inertial unit onboard the moving body as it travels this path around the Earth. This is because this accelerometer and gyro information includes, in addition to information from the inertial unit located at a point with fixed coordinates, additional accelerometer and gyro information calculated in real time by the theoretical model M1 and the simulation model M2.

The information delivered by the real inertial unit 7 consists of measurements effected at the laboratory fixed point and is not completely representative of the information that would be delivered by the inertial unit onboard the moving body traveling around the Earth.

More particularly, the theoretical inertial data T1 calculated using the theoretical model M1 corresponds to the theoretical expression of the measurements that the real inertial unit 7 at the laboratory fixed point is deemed to have carried out, and is highly representative, since this calculation uses the kinematic data applied to the real inertial unit 7. Moreover, the simulation inertial data T2 is representative of the measurements effected by the inertial unit 7 onboard the moving body when traveling around the Earth.

Taking account of the measurement inertial data R and the corresponding theoretical inertial data T1 eliminates any error caused by effecting the measurements at the fixed point. Consequently, adding the contribution of the simulation inertial data T2 to the measurement inertial data R and the theoretical inertial data T1 yields a path representative of reality and unaffected by the problem associated with effecting the measurements at the fixed point.

Figure 3:
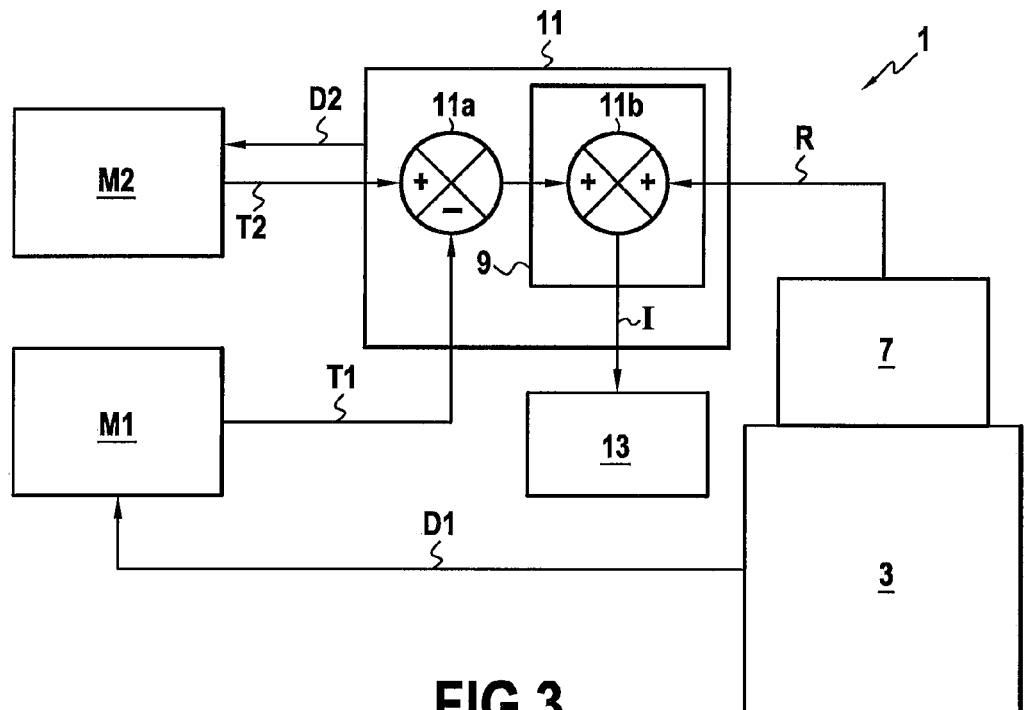
FIGS. 3 to 5 show different embodiments of the invention.

FIG. 3 shows diagrammatically one embodiment of a function verification system of FIG. 2. In this embodiment, the calculation means 11 include first and second arithmetic operation means 11a and 11b applying arithmetical operations to the measurement inertial data R, the simulation inertial data T2, and the theoretical inertial data T1 to calculate inertial data I.

Accordingly, the first arithmetical operation means 11a calculate the difference between the simulation inertial data T2 and the theoretical inertial data T1. The second arithmetic operation means 11b add the resulting difference (T2−T1) to the measurement inertial data R to express the inertial data I according to the formula I=T2+R−T1.

The control commands D2 are then calculated as a function of this inertial data I defined as the sum of the measurement inertial data R and the simulation inertial data T2 less the theoretical inertial data T1.

This embodiment is based on the hybrid simulation by the function verification system 1 using a difference between the measurement inertial data R supplied by the inertial unit 7 onboard the movement simulator 3 and the theoretical inertial data T1 supplied by the theoretical model M1.

Given the formula I=T2−T1+R, since R and T1 depend on the movements accomplished by the movement simulator 3, they remain consistent, even if the simulator does not execute the command correctly. This means that an accurate path of the moving body can be computed using a movement simulator 3 of lower cost.

Moreover, when the validation means 13 compare the predetermined reference path and the path of the moving body produced by the function verification system 1 off-line, the validity of the inertial unit 7 is a function of the difference between R and T1.

If R=T1, then I=T2, which corresponds to the two paths being superposed, and the inertial unit 7 is then perfect. The path of the moving body obtained with this kind of inertial unit 7 is then very close to the results obtained using only the real onboard computer 9 in the hybrid simulation.

If R is close to T1 (for example if |R−T1|=ϵ where ϵ is a low value), then a difference is perceived between the two paths but the result remains within acceptable limits and the path can be considered to conform to expectations. The inertial unit 7 then has non-nominal characteristics but remains within the limits or tolerances set out in its specification.

If R is not close to T1, then the two paths are clearly different, the moving body does not reach the target (true path) but the onboard computer 9 considers it has reached the target (estimated path). This indicates that the inertial unit 7 is suffering from a serious fault.

In other words, the inertial unit 7 can be considered valid if the difference between the inertial data I and the simulation inertial data T2 is bounded by a predetermined threshold value (|I−T2|≦ϵ).

Moreover, by calculating the theoretical expression T1 of the measurements that the real inertial unit 7 is deemed to have carried out at the fixed point, subtracting T1 from R, and adding the contribution of the simulation inertial data T2 (representing the measurements effected by the inertial unit onboard the moving body moving around the Earth), a path is obtained representative of reality. It should be noted that subtracting T1 from R removes the contribution of the real inertial unit to the nearest η where η=|R−T1| and the value of η is directly proportional to the imperfection of the inertial unit 7.

In this example, paths can be computed with a simulation model M2 taking account of the various tolerances of the inertial unit 7. For example, a particular number N of paths can be computed by modulating the variables within their tolerances to obtain a tangle of paths. If the "true" path, i.e. that obtained with the real inertial unit 7, is included in the tangle obtained by numerical simulation, then the inertial unit 7 can be considered valid. If not, it is suffering a fault.

Figure 4:
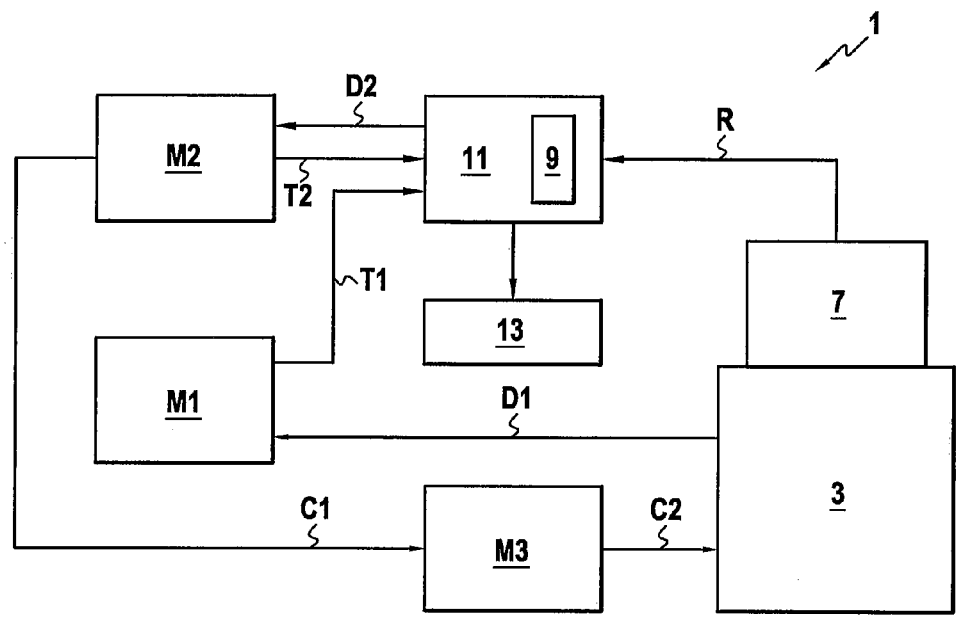

FIG. 4 shows diagrammatically that the function verification system 1 further includes a phase advance model M3 that is fed in real time with input data or kinematic commands C1 by the simulation module M2 and supplies output kinematic commands C2 to the movement simulator 3 to compensate an execution delay inherent to the movement simulator 3.

Generally speaking, the system for navigating and controlling a moving body includes a "control" function that is intended to produce instructions for operating control means compatible with the characteristics of the moving body. This is an automatic function, using inertial information or data and possibly information or data of a different kind (if there is an additional, non-inertial unit), judging the accomplishment of the instruction previously commanded in real time, and adapting the level of the next command instruction as required. If the control means do not react quickly enough, the control function will realize this and give stronger commands to compensate this execution delay.

The input kinematic commands C1 advantageously have a profile synchronous with that of the kinematic data D1. Moreover, the amplitudes of the kinematic data D1 and the input kinematic commands C1 are consistent. The simulation of the inertial unit is then synchronized with the angular kinematics of the moving body, guaranteeing that the use of the inertial unit and any other sensors onboard on the movement sensor at the same time is representative.

Figure 5:
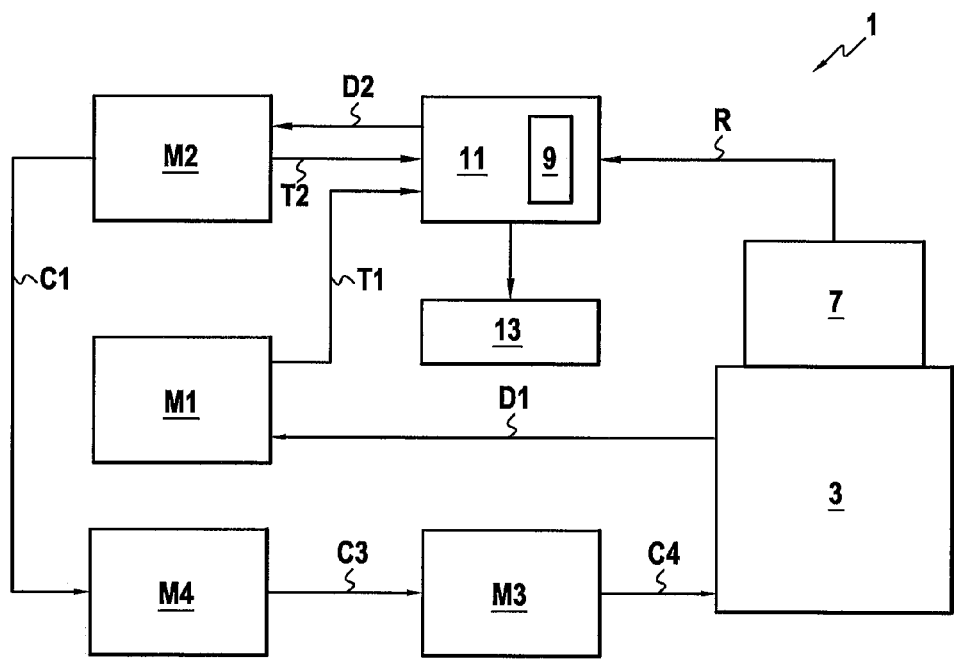

FIG. 5 shows diagrammatically that the function verification system from FIG. 4 further includes a masking model M4, which in this example is downstream from the simulation model M2 and upstream from the phase advance model M3. Accordingly, the masking model M4 is fed in real time by the simulation model M2 with the input kinematic commands C1 and supplies masked kinematic commands C3 to the phase advance module M3 for masking at least some of the phases of movement of the moving body.

The phase advance model M3 then supplies to the movement simulator 3 output kinematic commands C4 that take account of the masked kinematic commands C3 to produce a path for which the range of angular movement and/or the dynamics of the moving body exceed that authorized by the movement simulator 3.

Thus an angular movement of the movement simulator 3 or cessation of that movement, commanded intentionally from the masking model M4, is taken into account in the measurement inertial data R and the theoretical inertial data T1 but does not affect the control commands D2.

According to the FIG. 3 example, and by virtue of the formula I=T2−T1+R, the inertial data I is not affected by any angular movement of the movement simulator 3 or by the stopping of such movement at the command of the masking model M4.

Moreover, a surveillance function implemented in the masking model M4 limits the commanded range of angular movement before the hardware or software stops of the movement simulator 3 are reached.

It should be noted that the theoretical model M1, the simulation model M2, the phase advance model M3, and/or the masking model M4 can be included in the electronic data processing device 5 from FIG. 1.

Figure 6:
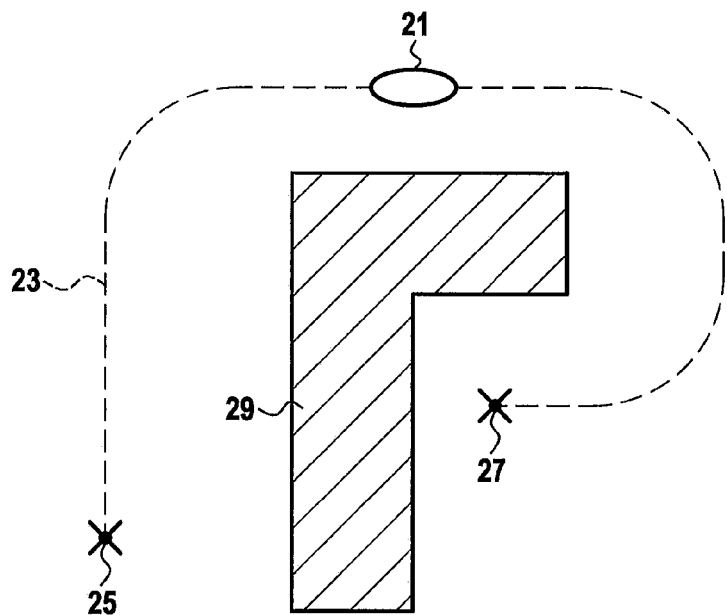
FIG. 6 shows diagrammatically one example of the path of a moving body.

FIG. 6 shows diagrammatically one example of computing a path around an obstacle.

For example, using an underspecified movement simulator 3 having a capacity in terms of the range of angular movement about the yaw axis of ±100 degrees, which corresponds to an angular excursion of 200 degrees, a path can be computed having an angular excursion of 270 degrees. Accordingly, in this example, the moving body 21 can follow a path 23 from a start point 25 to an arrival point 27 circumventing an obstacle 29 by means of an angular excursion of 270 degrees.

During computation of the path 23, the angular position of an axis of the movement simulator 3 can be modified. For example, the yaw axis A3 of the movement simulator 3 can be controlled independently of the yaw of the moving body 21.

At least some of the masked kinematic commands C3 can advantageously depend on a law internal to the masking model M3. In particular, the internal law is independent of the input kinematic commands C1. Accordingly, a movement command can be injected into the movement simulator 3 from the masking model M4 independently of input kinematic commands C1 coming from the simulation module M2. This enables a path to be computed in which the moving body can execute a plurality of loops with a movement simulator 3 having a limited range of angular movement.

Moreover, the path can have a dynamic range greater than that authorized by the movement simulator 3.

For example, should the input kinematic commands C1 for a transient event command a speed greater than the speeds that the movement simulator 3 is capable of generating, the characteristics of the kinematic data D1 actually executed by the movement simulator 3 are reduced relative to the input kinematic commands C1. This insufficient movement is taken into account in the measurement inertial data R and the theoretical inertial data T1. Nevertheless, by virtue of the formula I=T2−T1+R, the inertial data I is not affected by the movement being insufficient. Thus the path is not affected by the underspecification of the movement simulator 3.

The invention is also directed to a computer program downloadable from a communications network and comprising program code instructions for executing steps of the control method of the invention when it is executed on the computer 5. This computer program may be stored on a computer-readable medium and may be executable by a microprocessor.

This program may use any programming language and take the form of source code, object code or code intermediate between source code and object code, such as a partially-compiled form, or any other desirable form.

The invention is also directed to a computer-readable information medium containing instructions of the above computer program.

The information medium can be any device capable of storing the program. For example, the medium can include storage means, such as a ROM, for example a CD ROM or a micro-electronic circuit ROM, or magnetic storage means, for example a floppy disk or a hard disk.

The invention claimed is:

1. A method of verifying the functioning of an inertial unit for a moving body, the unit being mounted on a movement simulator and supplying in real time measurement inertial data representing a movement applied by said movement simulator, the method comprising:

theoretical modeling of the inertial unit onboard the movement simulator, said theoretical modeling being fed in real time with kinematic data actually executed by the movement simulator and supplying in real time theoretical inertial data representing said measurement inertial data deemed to be measured by the inertial unit on the movement simulator;

simulation modeling comprising modeling of the inertial unit in a real navigation environment, the simulation modeling being fed in real time with control commands and supplying in real time simulation inertial data representing output data from the inertial unit in said real navigation environment, said simulation modeling taking account of said control commands to compute a path of the moving body using the inertial unit;

calculating said control commands as a function of the inertial data defined by the sum of the measurement inertial data plus the simulation inertial data minus the theoretical inertial data; and validating the inertial unit by comparing the path of the moving body obtained using the inertial unit with a predetermined reference path.

2. A method according to claim 1, wherein the measurement inertial data includes accelerometer information from accelerometers of said inertial unit, and the theoretical inertial data includes theoretical accelerometer information.

3. A method according to claim 2, wherein the measurement inertial data further includes gyro information from gyros of said inertial unit, the theoretical inertial data includes theoretical gyro information, and the simulation inertial data includes simulation gyro information and simulation accelerometer information.

4. A method according to claim 1, wherein the inertial unit is considered valid when the difference between the inertial data and the simulation inertial data is bounded by a predetermined threshold value.

5. A method according to claim 1, further comprising phase advance modeling fed in real time with input kinematic commands from the simulation modeling and supplying output kinematic commands to the movement simulator for compensating an execution delay inherent to said movement simulator.

6. A method according to claim 5, wherein said input kinematic commands have a profile synchronous with that of the kinematic data and the amplitudes of said kinematic data and said input kinematic commands are consistent.

7. A method according to claim 6, further comprising masking modeling downstream from the simulation modeling and upstream from the phase advance modeling, so that the masking modeling is fed in real time with the input kinematic commands, the masking modeling supplying masked kinematic commands to the phase advance modeling to mask at least some of the phases of the movement.

8. A method according to claim 7, wherein at least some of the masked kinematic commands depend on a law internal to the masking modeling that is independent of the input kinematic commands.

9. A non-transitory computer readable medium comprising code instructions for executing steps of the control method according to claim 1 when it is executed on a computer.

10. A system for verifying the functioning of an inertial unit for a moving body, the unit being mounted on a movement simulator and supplying in real time measurement inertial data representing a movement applied by said movement simulator, the system comprising:
 a theoretical model comprising modeling of the inertial unit onboard the movement simulator, the theoretical model being fed in real time with kinematic data actually executed by the movement simulator and supplying in real time theoretical inertial data representing said measurement inertial data deemed to be measured by the inertial unit on the movement simulator;
 a simulation model comprising modeling of the inertial unit in a real navigation environment, the simulation model being fed in real time with control commands and supplying in real time simulation inertial data representing output data from the inertial unit in said real navigation environment, said simulation model taking account of said control commands to compute a path of the moving body using the inertial unit;
 calculation means for calculating said control commands as a function of the inertial data defined by the sum of the measurement inertial data plus the simulation inertial data minus the theoretical inertial data; and
 validation means for validating the inertial unit by comparing the path of the moving body obtained using the inertial unit with a predetermined reference path.

11. A system according to claim 10, wherein the validation means are adapted to consider the inertial unit valid when the difference between the inertial data and the simulation inertial data is bounded by a predetermined threshold value.

12. A system according to claim 11, further comprising a masking model between said simulation model and said phase advance model, so that the mask modeling is fed in real time with the input kinematic commands, the masking model supplying masked kinematic commands to the phase advance model to mask at least some of the phases of the movement.

13. A system according to claim 10, further comprising a phase advance model fed in real time with input kinematic commands from the simulation model and supplying output kinematic commands to the movement simulator for compensating an execution delay inherent to said movement simulator.

* * * * *